Feb. 10, 1948. E. C. FIELDING 2,435,622
GRINDING MACHINE AND OTHER ROTARY ABRASIVE OR CUTTING MACHINE
Filed Sept. 20, 1946 6 Sheets-Sheet 1
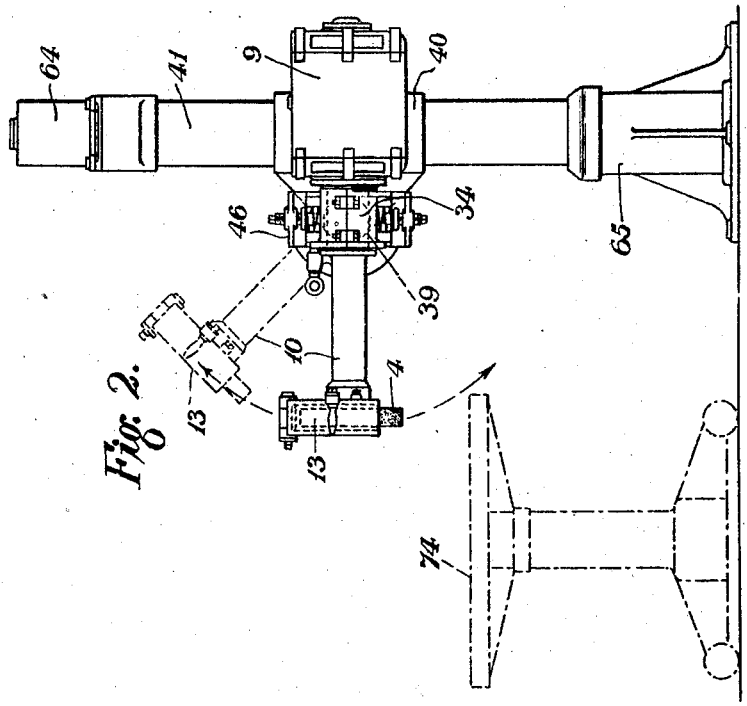
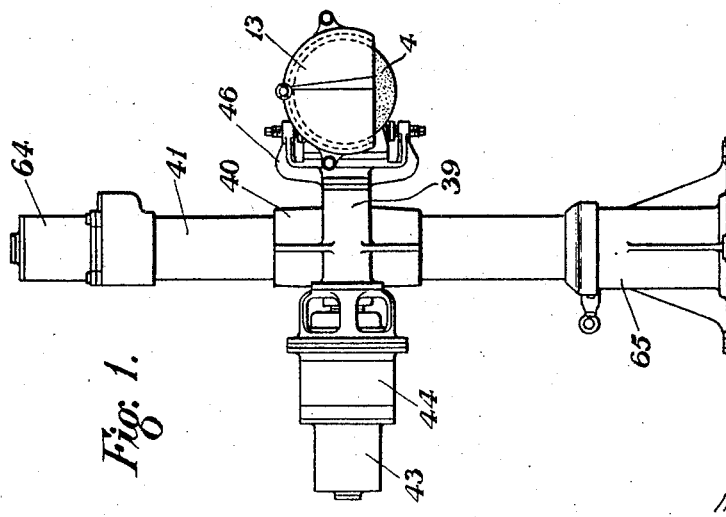
Inventor
EDGAR CHARLES FIELDING
by
*Richards & Geier*
Attorneys Feb. 10, 1948. E. C. FIELDING 2,435,622
GRINDING MACHINE AND OTHER ROTARY ABRASIVE OR CUTTING MACHINE
Filed Sept. 20, 1946 6 Sheets-Sheet 2
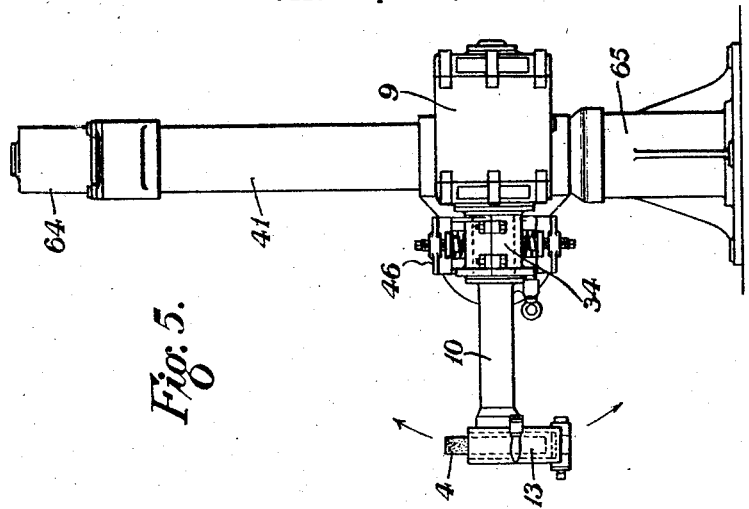
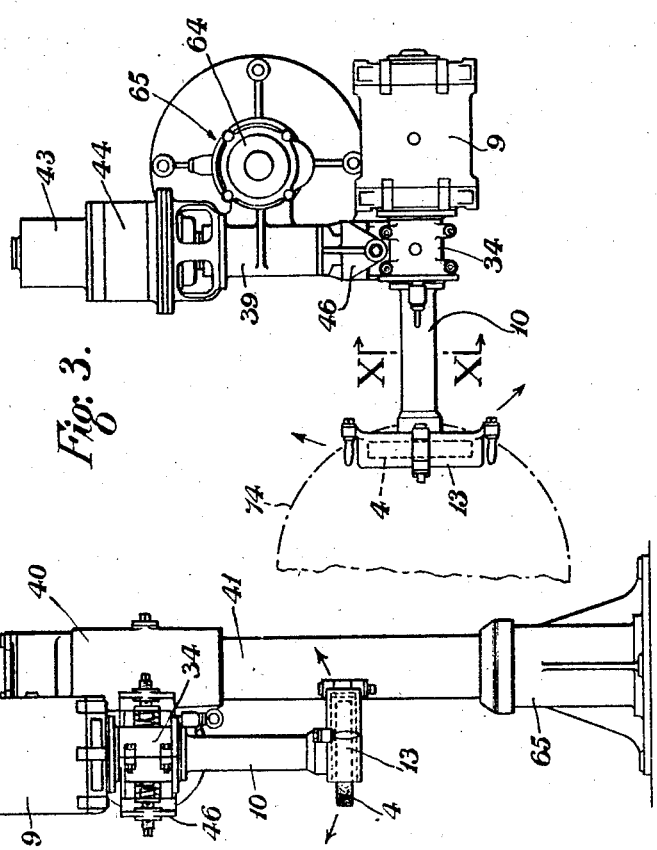
Inventor
EDGAR CHARLES FIELDING
by
Richards & Geier
Attorneys Feb. 10, 1948. E. C. FIELDING 2,435,622
GRINDING MACHINE AND OTHER ROTARY ABRASIVE OR CUTTING MACHINE
Filed Sept. 20, 1946 6 Sheets-Sheet 3
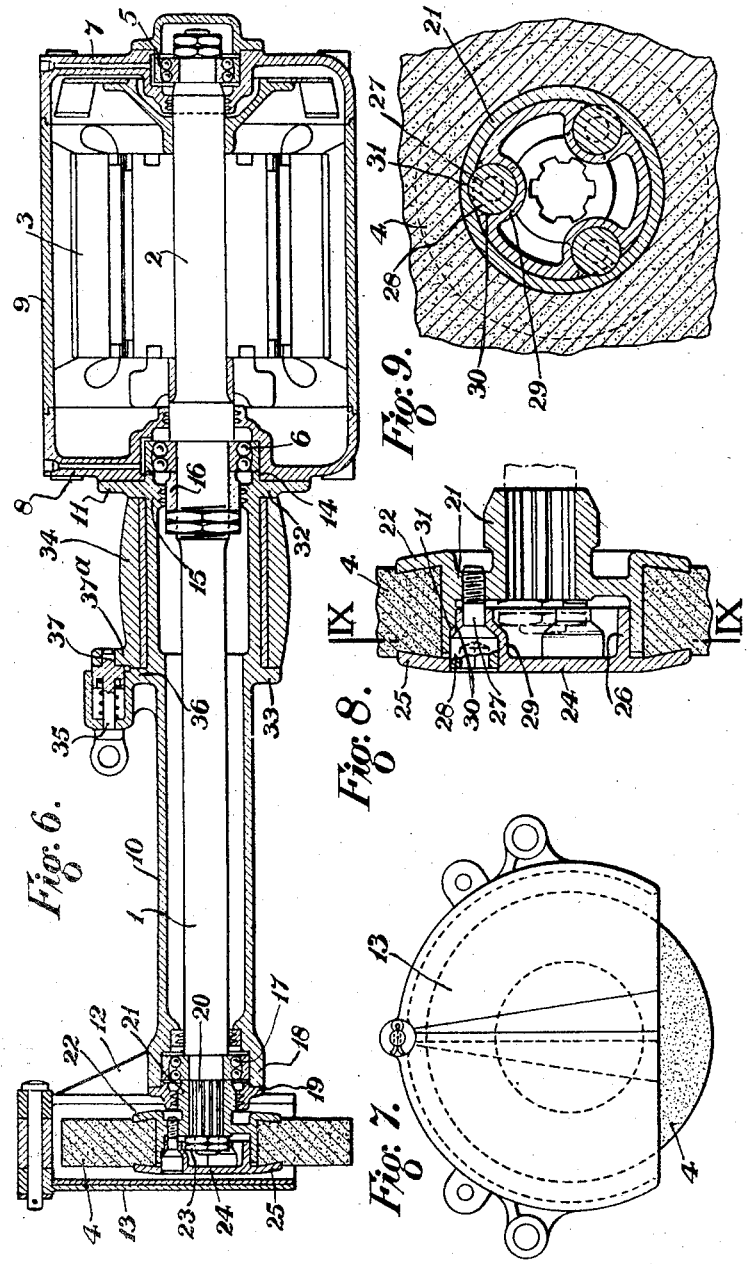
INVENTOR
Edgar Charles Fielding
BY
Richards & Geier
ATTORNEYS

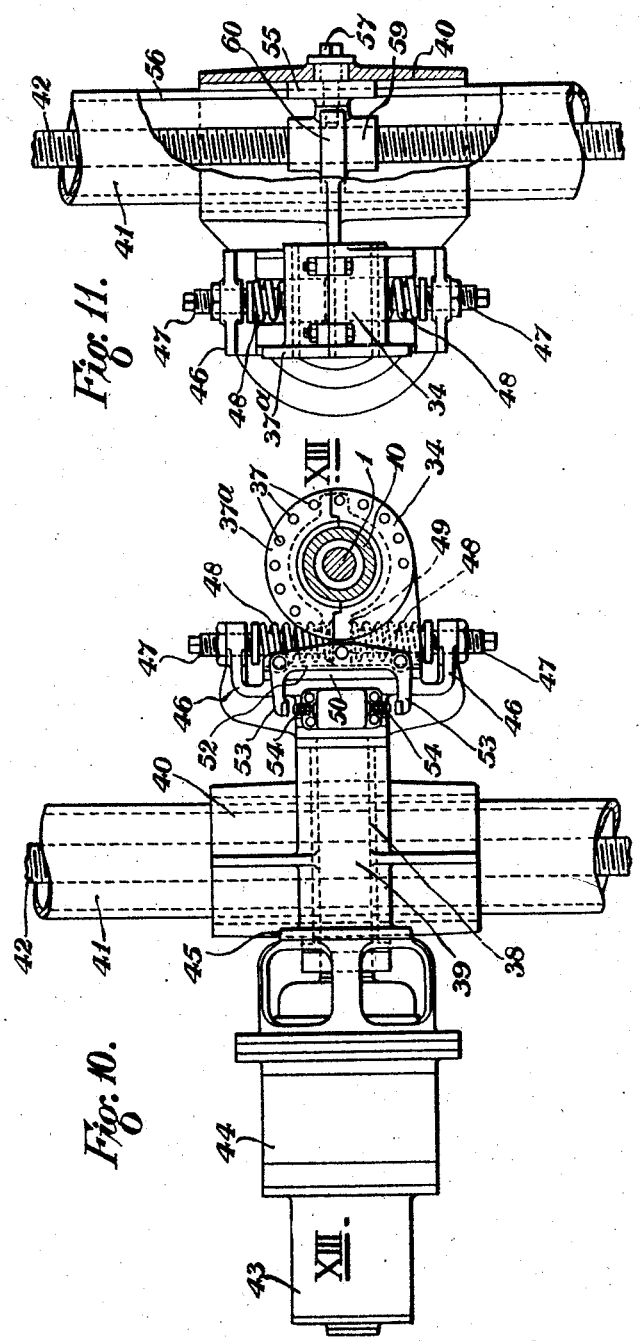

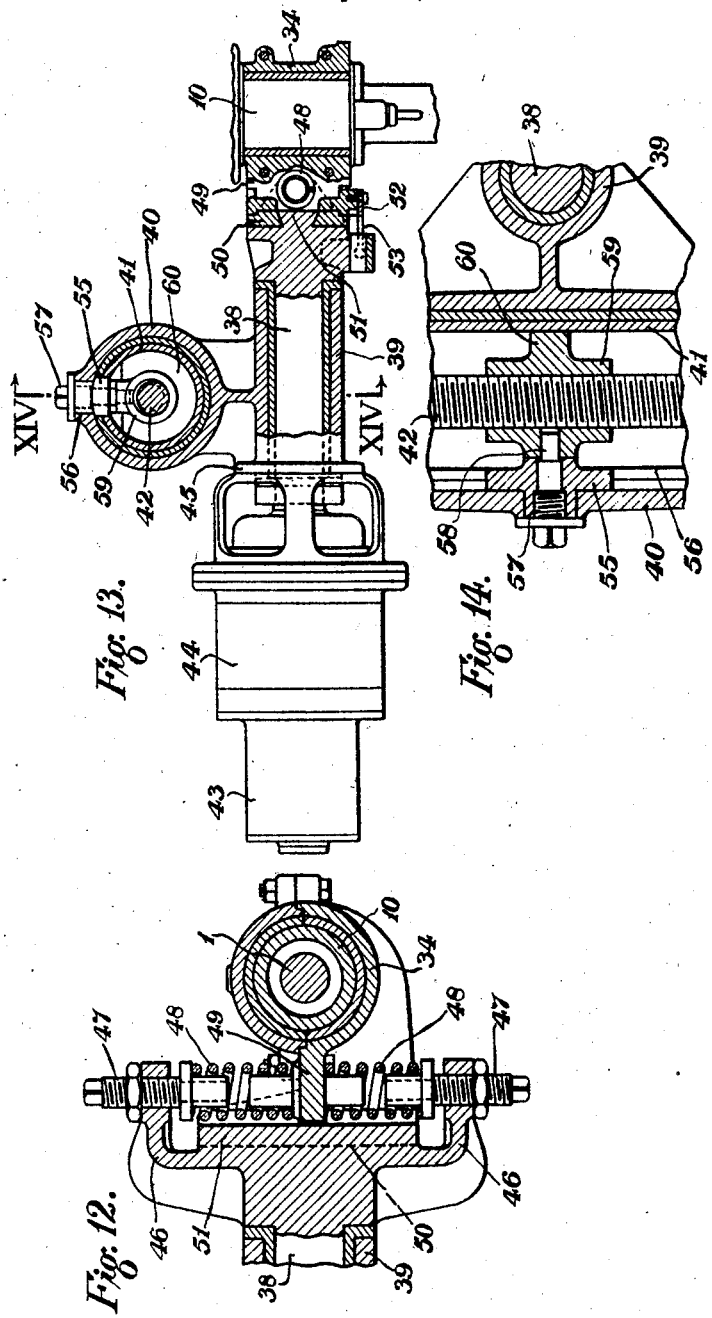

Feb. 10, 1948. E. C. FIELDING 2,435,622
GRINDING MACHINE AND OTHER ROTARY ABRASIVE OR CUTTING MACHINE
Filed Sept. 20, 1946 6 Sheets-Sheet 6

INVENTOR
Edgar Charles Fielding
BY
Richards & Geier
ATTORNEYS

Patented Feb. 10, 1948

2,435,622

UNITED STATES PATENT OFFICE 2,435,622

GRINDING MACHINE AND OTHER ROTARY ABRASIVE OR CUTTING MACHINES

Edgar Charles Fielding, Walsall, England

Application September 20, 1946, Serial No. 698,187
In Great Britain October 25, 1945

7 Claims. (Cl. 51—166)

This invention relates to grinding machines and other rotary abrasive or cutting machines employing a disc or wheel-like rotary operating member composed of an abrasive material or made of metal, such as, for example, a circular saw or a cut-off machine having a rotary operating member made of an abrasive material or of metal.

One of the objects of the present invention is to provide a self-contained power-driven grinding or rotary cutting unit which can be adjusted to bring the rotary grinding or cutting member into the most suitable position in relation to the work.

Another object is to provide for a practically universal adjustment of the position of the rotary grinding or cutting member in relation to the work with a minimum of physical effort on the part of the operator.

A further object is to enable the adjustment of the grinding or cutting member to be readily controlled from a convenient position.

According to the invention a grinding machine or other rotary abrasive or cutting machine comprises a power-driven grinding or cutting unit consisting of a rotary driving shaft, carrying a grinding wheel or circular cutting member at one end, and being in driving connection at the other end with an electric motor supported by a tubular housing which encloses the shaft, said tubular housing being carried or supported by a transverse shaft mounted in a bearing and adapted to be rotated by a motor supported by said bearing, whereby the unit may be rotated in a vertical plane to any desired position therein. The said transverse shaft bearing may be mounted upon a vertical column and raised and lowered thereon by a screw-and-nut or other device. For this purpose it may be carried by a sleeve slidably surrounding the column and coupled to an interior nut on an axial screw by means of a connecting member passing through a vertical slot in the column. If desired, the said column itself may be rotatably adjustable to enable the grinding or cutting unit to be swung in a horizontal plane.

The grinding or cutting unit may be mounted upon the transverse shaft through the medium of a shock-absorbing spring device.

Figure 1 of the accompanying drawings is a front elevation of a grinding machine in accordance with the present invention.

Figure 2 is a side elevation of the machine.
Figure 3 is a plan view.

Figure 4 is a side elevation showing how the grinding unit can be adjusted into a vertical depending position.

Figure 5 is a view showing the grinding unit lowered and inverted.

Figure 6 is a longitudinal section through the grinding unit.

Figure 7 is an end view thereof as seen from the grinding-wheel end.

Figure 8 is a section, on a larger scale, through the hub portion of the grinding wheel, showing how the wheel is clamped upon the hub.

Figure 9 is a transverse section on line IX—IX, Figure 8.

Figure 10 is a transverse section through the grinding unit, corresponding to line X—X, Figure 3, showing the transverse supporting shaft mounting in elevation.

Figure 11 is an end view of the said transverse shaft mounting with the grinding unit omitted and with the column and sliding sleeve in section to show the screw-and-nut elevating mechanism.

Figure 12 is a vertical longitudinal section through the shock-absorbing device by which the grinding unit is mounted on the transverse shaft.

Figure 13 is a horizontal section through the transverse shaft mounting and column, corresponding to line XIII—XIII, Figure 10.

Figure 14 is a vertical section through the column and elevating nut, on line XIV—XIV, Figure 13.

Figure 17:
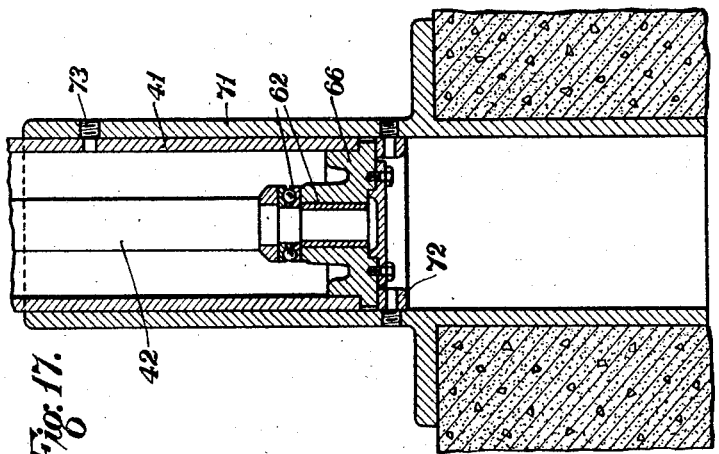
Figure 17 shows a vertical section through the base portion of the column according to a modification.
Figure 16:
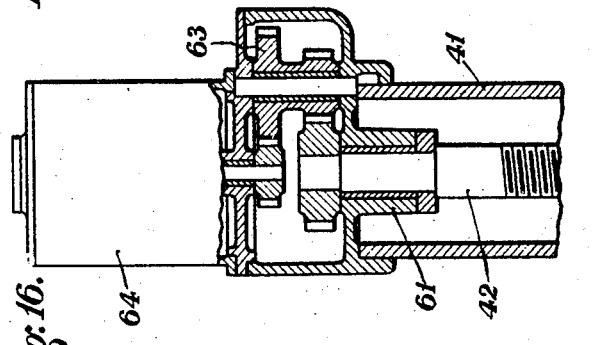
Figure 16 is a vertical section through the head of the column, showing the driving means for the elevating screw.
Figure 15:
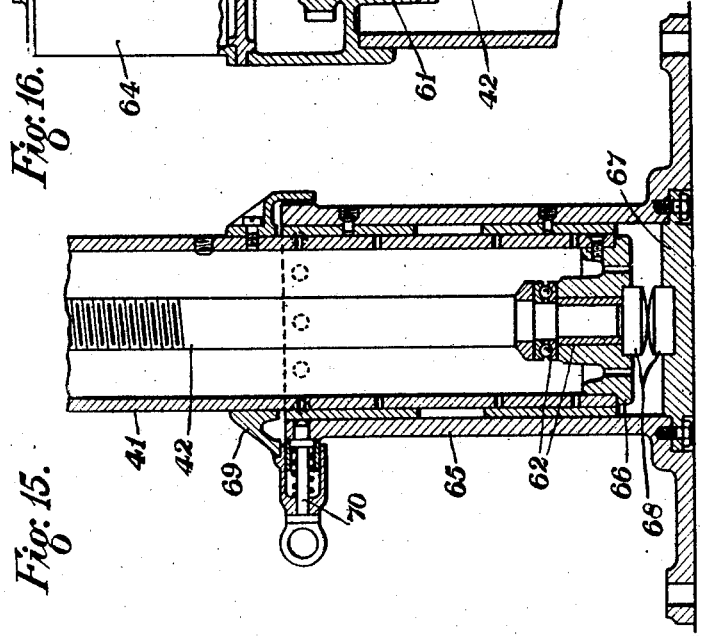
Figure 15 is a vertical section through the base portion of the column.

Referring to Figures 1 to 16 of the drawings, which show a convenient embodiment of the invention as applied to a grinding machine, the grinding unit, forming part of the machine, consists of a normally horizontal driving shaft I (Figure 6) which is an extension of, or is coupled in alignment to, the shaft 2 of an electric motor 3 located at one end of the unit. The end of the driving shaft 1 remote from the motor 3 carries a grinding wheel 4, preferably by the means hereinafter described; and the motor shaft 2 (of which the driving shaft 1 is an extension) is conveniently supported on ball or roller bearings 5, 6, carried by the end covers or shields 7, 8, of the motor casing 9. The bearing 5 at the outer end of the motor may be designed to take journal loads only, but the bearing 6 at the inner end is designed to take thrust loads in both directions as well as journal loads.

The driving shaft 1 is enclosed within a longitudinal concentric tubular housing 10 one end of which has a flange 11 by means of which it is attached to the inner end cover or shield 8 of the motor casing, whilst the other end, which stops short of the grinding wheel 4, is provided with a bracket 12 or the like to which is attached a guard 13 which encloses the grinding wheel 4 except for a small peripheral segment of the wheel. This guard may be constructed as described in my United States patent application, Serial No. 698,188.

The housing 10 may be located centrally on the motor casing by means of a shoulder 14 on the end cover 8 of the casing; and adjacent said cover the housing may have an internal lubricant-retaining collar or flange 15 in close proximity to a sleeve 16 on the shaft 1. At the grinding wheel end, the driving shaft 1 is supported within the housing 10 upon a ball or roller bearing 17 located within an enlargement 18 of the end of the housing, said bearing being designed for journal load only. A cap or cover 19 is fixed to the end of the tubular housing to act as a dust cover to the bearing, and the end of the driving shaft extends through this cap. This projecting end of the shaft is splined at 20 to carry a grinding-wheel hub device consisting of two flanged members (Figures 8 and 9). One of these members directly supports the wheel and comprises a centrally-bored boss 21 which is splined to fit on to the end 20 of the shaft and which carries a flange 22 to engage one side of the wheel 4. This member of the hub is secured upon the splined end of the shaft by means of nuts 23 (Figure 6) screwed upon a reduced extremity of the shaft, these nuts being housed within a central recess in the end of the member 21, 22. The other member of the hub consists of a disc or plate 24 having a peripheral flange portion 25 to engage the outer face of the grinding wheel and provided with a concentric annular boss or flange 26 on its inner face which fits closely within the recessed outer side of the other hub member. This outer disc or plate is secured to the main wheel-supporting hub member 21, 22, by three or other suitable number of screw studs 27 each of which has a cylindrical hollow head 28 recessed to receive a turning tool and adapted to lie flush with or inwards of the outer face of the disc 24 when screwed up. Each stud 27 is passed through a sleeve or socket 29 projecting from the inner face of the disc 24, and the head portion 28 protrudes through a gap 30 in an enlarged outer portion of the socket 29 in order to engage a segmental recess 31 in the boss 21 of the main member. The heads of the studs thus act as keys to lock the two hub members together and to prevent the outer disc or plate from turning.

The tubular housing 10 is machined externally to form a journal surface adjacent the inner end of the motor casing, and locating flanges 32, 33, are provided at the ends of said surface. The flanged journal part thus formed is rotatably mounted in a two-part bearing sleeve 34 having a removable top cap, and the tubular housing 10 with the motor 3 and grinding-wheel guard 13 can thus be turned about its axis, as a unit, within the bearing sleeve 34 in order to bring the exposed segmental portion of the wheel 4 to any desired position in relation to the work. It may thus be directed downwardly, upwardly, sideways or at any desired angle, and the unit is adapted to be fixed in its adjusted position by a suitable catch device, such as a spring-loaded horizontal pin 35 mounted in a flange 36 on the housing 10 and adapted to engage one or other of a circular series of spaced holes 37 or recesses in an end flange 37a of the bearing sleeve 34 (Figures 6 and 10). The said bearing sleeve 34 is adjustably supported upon a vertical column, being mounted upon the end of a horizontal shaft 38 rotatably adjustable in a horizontal sleeve bracket 39 carried by a vertical sleeve 40 slidably mounted upon the column 41 and adapted to be raised and lowered thereon by a motor-operated elevating screw 42, as hereinafter described. The horizontal shaft 38 is adapted to be rotated by means of an electric motor 43 and reduction-gear unit 44 attached to a flange 45 on the end of the sleeve bracket 39 which is remote from the grinding unit, the motor shaft being in alignment with the horizontal shaft 38. By operating the motor 43 the said shaft 38, which is at right-angles to the grinding unit axis, may be turned about its axis through any desired angle, thereby rotating the grinding unit bodily in a vertical plane to bring the axis of the grinding wheel into any desired angular position relatively to the normal horizontal position.

The bearing sleeve 34 supporting the grinding unit is preferably mounted upon the above-mentioned horizontal shaft through the medium of a shock-absorbing spring device. For this purpose the said shaft 38 terminates, at the end remote from the electric motor 43, in a forked bracket or head 46 (Figure 12) the arms or jaws of which carry adjustable screws 47 between which two coiled compression springs 48 are disposed in axial alignment. The bearing sleeve 38 is provided with a lateral arm or web 49 which extends between the adjacent ends of the springs 48 and terminates in a dovetail-section vertical slide 50 (Figure 13) which engages a corresponding vertical dovetail guide 51 on the forked bracket or head 46. The grinding unit can thus rise and fall within the forked bracket against the action of the springs, so that the load on the grinding wheel is transmitted to the bracket or head through the springs which thus tend to absorb shocks and overloads on the grinding wheel.

The compression of the shock-absorbing springs, due to the load on the grinding wheel, may, if desired, be used to operate a trip switch which would energise a trip coil or open a no-volt circuit on the contactor or breaker, which controls the electric current supply to the motor on the grinding unit. For this purpose (see Figure 10) the lateral arm or web 49 of the bearing sleeve supporting the unit may carry at one side a contact plate 52 having two spaced jaws 53, 53, normally spaced from two contact points 54, 54, in the circuit, one or other of said arms being adapted to make contact with one of the points, in the event of an overload on the wheel, according to which of the two springs is compressed.

To provide for the bodily raising and lowering of the grinding unit, the vertical sleeve 40 which is slidable upon the column 41 is fitted with a rectangular slide block 55 (Figures 11, 13 and 14) extending radially inwards and engaging a vertical slot 56 in the wall of the column, within which it can slide. Screwed radially into the slide block is a screw-pin 57 having a plain end 58 (Figure 14) projecting from the block and engaging a recess in a nut 59 mounted upon the vertical screw-threaded elevating shaft 42 passing axially through the column. The nut 59 preferably has a flange 60 which fits and is guided by the interior surface of the column; and the screw shaft 42 is mounted in bearings 61, 62, respectively at top and bottom of the column, so that it can rotate but cannot move endwise. The lower bearing 62 (Figure 15) is designed to take end thrust as well as journal load, but that at the top (Figure 16) may be a plain journal bearing with a locating collar to prevent the shaft from rising or jumping. The upper end of the screw shaft 42 is connected through reduction gearing 63 (Figure 16) to an electric motor 64 mounted on the top of the column 41 and by means of which the shaft 42 may be rotated and thus the nuts 59 raised or lowered, the grinding unit being consequently raised or lowered correspondingly.

The column 41 itself may be mounted so that it can be swivelled or rotated about its axis, and thus the whole grinding assembly adjusted angularly in a horizontal plane. For this purpose the bottom of the column (Figure 15) is rotatably mounted in a fixed base socket 65, and its lower open end is fitted with a closure plate 66 which may support the bottom bearing 62 and which rests upon a base plate 67 through the medium of two convex-surfaced steel pads 68. In order to lock the column in any adjusted position, it may carry a bracket 69 supporting a spring-loaded locking pin 70 adapted to engage one or other of a circular series of holes around the top portion of the base socket 65.

Instead of the column 41 being rotatable, it may, as shown in Figure 17, be fixed in position within a base socket 71. A plate 66 closing the lower open end and carrying the bearing 62 for the screw 42 may rest upon a fixed interior flange or ring 72 within the socket, and the column 41 may be secured within the socket 71 by means of set-screws 73 or the like passed through the walls of the two parts.

When a swivelling column is employed a practically universal adjustment of the position of the exposed working portion of the grinding wheel 4 can be obtained, as the grinding unit can be raised and lowered, rotated in a vertical plane, turned about its own axis, and swung in a horizontal plane. Thus, in the position shown in full lines in Figures 1 and 2, the grinding unit can be used horizontally, with the wheel presented downwards to co-operate with work on a table indicated at 74, but the unit can be rotated in a vertical plane about the axis of the transverse shaft 38, so as to take any desired angular position, such as represented by dotted lines in Figure 2. Or, as shown in Figure 4, the unit can be inverted, with the grinding wheel horizontal. The unit can be raised and lowered upon the column 41, and turned about its own axis. Thus, as shown in Figure 5, it may be lowered and the exposed part of the wheel 4 presented upwardly. Also, the column itself may be rotated, as already described.

If desired, the guard 13 on the housing of the grinding unit may be omitted and various shaped grinding wheels suitable for the internal grinding of cylinders, hollow castings or the like, may be substituted for the ordinary form of grinding wheel with guard used for external grinding. In this case the angular adjustment of the housing 10 within the sleeve 34 would not be needed, and said housing could be fixed in said sleeve, or it could directly carry the arm 49 which co-operates with the shock-absorbing device.

Instead of a screw and nut device for raising and lowering the sleeve 49 upon the column, any other suitable means may be provided, such as chain and sprocket gearing.

The application of the invention to other rotary abrasive or cutting machines, such as a circular sawing or a cut-off machine having a rotary wheel or disc-like cutter, differs in no essential respect from its application to a grinding machine, an appropriate rotating wheel or cutter being substituted for a grinding wheel.

I claim:

1. A rotary abrasive or cutting machine comprising a grinding or cutting unit consisting of a driving shaft, a wheel-like member at one end thereof, an electric motor in driving connection with the other end, and a tubular housing enclosing the shaft and carrying the motor; a rotatable transverse shaft carrying the housing of said unit; a bearing supporting said transverse shaft at right-angles to the axis of the unit; and an electric motor carried by said bearing and in driving connection with the transverse shaft, whereby the unit may be rotated in a vertical plane to any desired position therein.

2. A rotary abrasive or cutting machine comprising a grinding or cutting unit consisting of a driving shaft, a wheel-like member at one end thereof, an electric motor in driving connection with the other end, and a tubular housing enclosing the shaft and carrying the motor; a rotatable transverse shaft carrying the housing of said unit; a bearing supporting said transverse shaft at right-angles to the axis of the unit; an electric motor carried by said bearing and in driving connection with the transverse shaft for rotating the unit in a vertical plane; a column on which the bearing for the transverse shaft is slidably mounted; and means for raising and lowering the said bearing upon the said column.

3. A rotary grinding machine comprising a grinding unit consisting of a driving shaft, a grinding wheel on one end thereof, an electric motor in driving connection with the other end, and a tubular housing enclosing the shaft and carrying the motor; a rotatable transverse shaft carrying the housing of the unit; a bearing supporting said transverse shaft at right-angles to the axis of the unit; an electric motor carried by said bearing and in driving connection with the transverse shaft for rotating the unit in a vertical plane; a vertical sleeve carrying the bearing for the transverse shaft; a column having a vertical slot and on which the sleeve is slidably mounted; an axial elevating screw within the column; a nut on said screw; and a connecting member slidable in the slot of the column and connecting the nut to the sleeve.

4. A rotary grinding machine comprising a grinding unit consisting of a driving shaft, a grinding wheel on one end thereof, an electric motor in driving connection with the other end, and a tubular housing enclosing the shaft and carrying the motor; a rotatable transverse shaft at right-angles to the axis of the unit; a shock-absorbing spring device connecting the housing of the unit to one end of the transverse shaft; a bearing supporting the transverse shaft; an electric motor carried upon the bearing and in driving connection with the transverse shaft for turning the unit in a vertical plane; a vertical sleeve carried by the bearing for the transverse shaft; a column on which the sleeve is slidably mounted; and a screw-and-nut device for raising and lowering the sleeve on the column.

5. A rotary grinding machine comprising a grinding unit consisting of a driving shaft, a grinding wheel on one end thereof, an electric motor in driving connection with the other end, and a tubular housing enclosing the shaft and carrying the motor; a rotatable transverse shaft at right-angles to the axis of the unit; an arm on the housing of the unit; a guide member on said arm; a guide on an end of the transverse shaft engaged by said guide member on the arm; a forked bracket on said end of the transverse shaft; springs between said arm and said forked bracket; a bearing supporting the transverse shaft; an electric motor carried upon the bearing and in driving connection with the transverse shaft for turning the unit in a vertical plane; and a column on which the bearing for the transverse shaft is vertically adjustable.

6. A rotary grinding machine comprising a grinding unit consisting of a driving shaft, a grinding wheel on one end thereof, a wheel guard on said end, an electric motor in driving connection with the other end, a tubular housing enclosing the shaft and carrying the motor; a bearing in which the housing of the unit is rotatably mounted; means for fixing the housing in different angular positions within the bearing; a rotatable transverse shaft at right angles to the axis of the unit and carrying the bearing of said unit at one end; a bearing supporting the transverse shaft; an electric motor carried upon the bearing for the transverse shaft and in driving connection with the latter for turning the unit in a vertical plane; and a column on which the bearing for the transverse shaft is vertically adjustable.

7. A grinding machine comprising a grinding unit consisting of a driving shaft, a grinding-wheel on one end thereof, an electric motor in driving connection with the other end, and tubular housing enclosing the shaft and carrying the motor; a rotatable transverse shaft at right-angles to the axis of the unit and carrying the unit at one end thereof; a bearing for said transverse shaft; an electric motor carried by said bearing and in driving connection with the transverse shaft; a vertical sleeve carrying said bearing for the transverse shaft; a column upon which the sleeve is vertically adjustable; and screw-and-nut mechanism for raising and lowering the sleeve on the column; and a base socket in which the column is rotatably adjustable to enable the unit to be swung in a horizontal plane.

EDGAR CHARLES FIELDING.

REFERENCES CITED

The following references are of record in the file of this patent:

UNITED STATES PATENTS

| Number | Name | Date |
| --- | --- | --- |
| 1,413,928 | Mummert et al. | Apr. 25, 1922 |
| 1,462,420 | Mikaelson et al. | July 17, 1923 |
| 1,798,224 | Rinau | Mar. 31, 1931 |
| 2,418,728 | Talboys | Apr. 8, 1947 |

FOREIGN PATENTS

| Number | Country | Date |
| --- | --- | --- |
| 650,470 | Germany | Sept. 23, 1937 |